(12) United States Patent
Kays et al.

(10) Patent No.: US 6,695,552 B1
(45) Date of Patent: Feb. 24, 2004

(54) HAND-DRIVEN DEBURRING AND ASSEMBLY TOOL

(76) Inventors: Jason A. Kays, 121 S. Washington St. Apt. 12, Genoa, IL (US) 60135; Kenneth R. Weber, 121 S. Washington St. Apt. 12, Genoa, IL (US) 60135

( * ) Notice: Subject to any disclaimer, the term of this patent is extended or adjusted under 35 U.S.C. 154(b) by 69 days.

(21) Appl. No.: 10/076,474

(22) Filed: Feb. 15, 2002

(51) Int. Cl.[7] .............................................. B23B 45/06
(52) U.S. Cl. ........................ 408/124; 408/53; 409/140
(58) Field of Search ............................ 408/42, 53, 124; 86/19.7, 24, 28, 33; 409/140

(56) References Cited

U.S. PATENT DOCUMENTS

| | | |
|---|---|---|
| 1,626,719 A | 5/1927 | Callison |
| 4,063,475 A | 12/1977 | Perkins |
| 4,082,473 A | 4/1978 | Bratsos |
| 4,702,131 A | 10/1987 | Snow |
| 5,050,475 A | 9/1991 | Kolmer |
| 5,415,670 A * | 5/1995 | Schmidt ..................... 86/19.7 |
| D363,419 S | 10/1995 | Dixon |

* cited by examiner

*Primary Examiner*—Daniel W. Howell

(57) ABSTRACT

A hand-driven deburring and assembly tool for deburring and assembly of fasteners in a minimal amount of time. The hand-driven deburring and assembly tool includes a housing assembly including a housing having top, bottom, front, back, side walls and an open side; and also includes a drive assembly being mounted to the housing; and further includes assembly and deburring tool support members being mounted to the drive assembly.

8 Claims, 2 Drawing Sheets

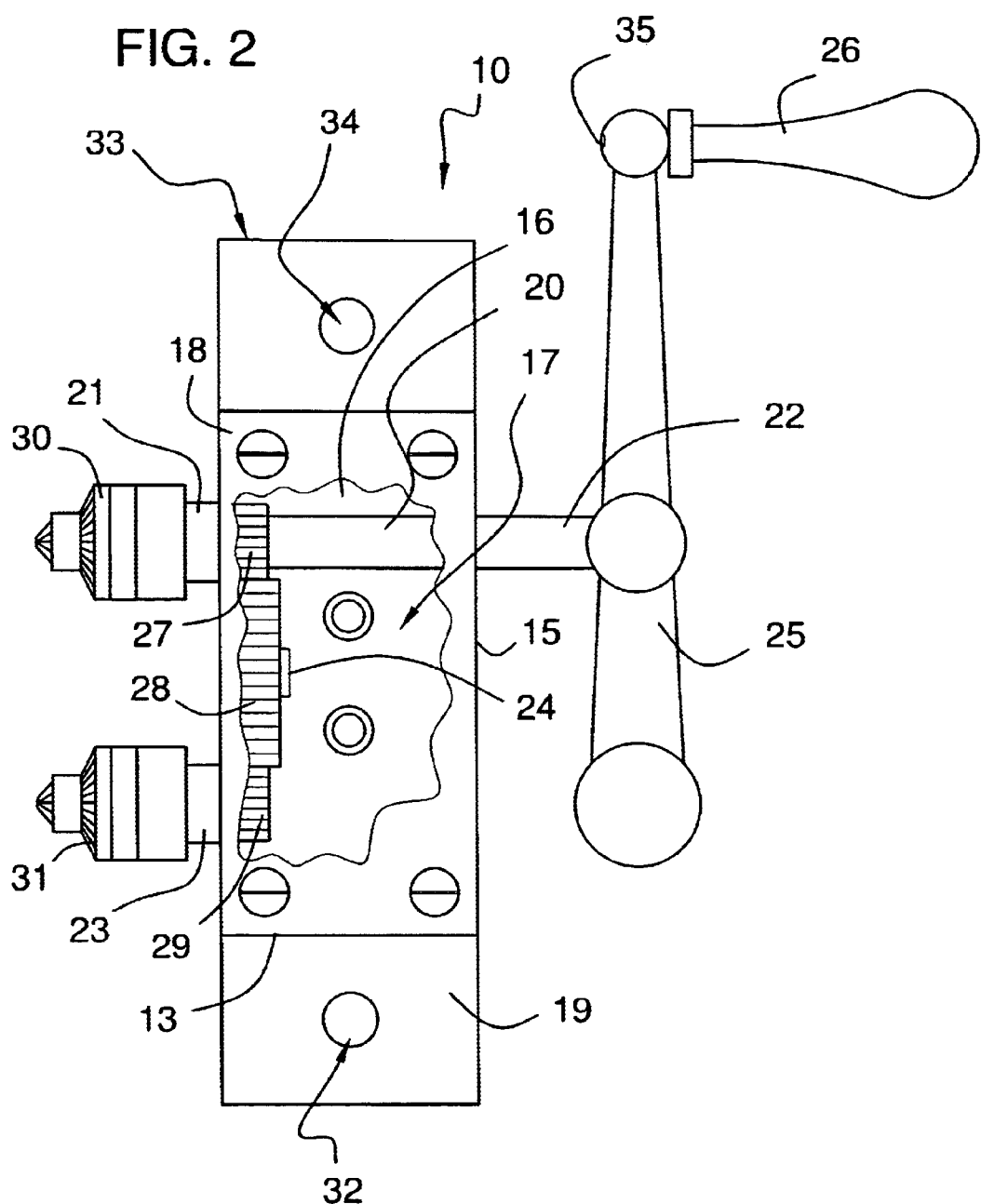

HAND-DRIVEN DEBURRING AND ASSEMBLY TOOL

BACKGROUND OF THE INVENTION

1. Field of the Invention

The present invention relates to a hole-finishing tool and more particularly pertains to a new hand-driven deburring and assembly tool for deburring and assembly of fasteners in a minimal amount of time.

2. Description of the Prior Art

The use of a hole-finishing tool is known in the prior art. More specifically, a hole-finishing tool heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,050,475; U.S. Pat. No. 4,063,475; U.S. Pat. No. 4,702,131; U.S. Pat. No. 1,626,719; U.S. Pat. No. 4,082,473; and U.S. Pat. No. Des. 363,419.

While these devices fulfill their respective, particular objectives and requirements, the aforementioned patents do not disclose a new hand-driven deburring and assembly tool. The inventive device includes a housing assembly including a housing having top, bottom, front, back, side walls and an open side; and also includes a drive assembly being mounted to the housing; and further includes assembly and deburring tool support members being mounted to the drive assembly.

In these respects, the hand-driven deburring and assembly tool according to the present invention substantially departs from the conventional concepts and designs of the prior art, and in so doing provides an apparatus primarily developed for the purpose of deburring and assembly of fasteners in a minimal amount of time.

SUMMARY OF THE INVENTION

In view of the foregoing disadvantages inherent in the known types of hole-finishing tool now present in the prior art, the present invention provides a new hand-driven deburring and assembly tool construction wherein the same can be utilized for deburring and assembly of fasteners in a minimal amount of time.

The general purpose of the present invention, which will be described subsequently in greater detail, is to provide a new hand-driven deburring and assembly tool which has many of the advantages of the hole-finishing tool mentioned heretofore and many novel features that result in a new hand-driven deburring and assembly tool which is not anticipated, rendered obvious, suggested, or even implied by any of the prior art hole-finishing tool, either alone or in any combination thereof.

To attain this? the present invention generally comprises a housing assembly including a housing having top, bottom, front, back, side walls and an open side; and also includes a drive assembly being mounted to the housing; and further includes assembly and deburring tool support members being mounted to the drive assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hand-driven deburring and assembly tool which has many of the advantages of the hole-finishing tool mentioned heretofore and many novel features that result in a new hand-driven deburring and assembly tool which is not anticipated, rendered obvious, suggested, or even implied by any of the prior art hole-finishing tool, either alone or in any combination thereof.

It is another object of the present invention to provide a new hand-driven deburring and assembly tool which may be easily and efficiently manufactured and marketed.

It is a further object of the present invention to provide a new hand-driven deburring and assembly tool which is of a durable and reliable construction.

An even further object of the present invention is to provide a new hand-driven deburring and assembly tool which is susceptible of a low cost of manufacture with regard to both materials and labor, and which accordingly is then susceptible of low prices of sale to the consuming public, thereby making such hand-driven deburring and assembly tool economically available to the buying public.

Still yet another object of the present invention is to provide a new hand-driven deburring and assembly tool which provides in the apparatuses and methods of the prior art some of the advantages thereof, while simultaneously overcoming some of the disadvantages normally associated therewith.

Still another object of the present invention is to provide a new hand-driven deburring and assembly tool for deburring and assembly of fasteners in a minimal amount of time.

Yet another object of the present invention is to provide a new hand-driven deburring and assembly tool which includes a housing assembly including a housing having top, bottom, front, back, side walls and an open side; and also includes a drive assembly being mounted to the housing; and further includes assembly and deburring tool support members being mounted to the drive assembly.

Still yet another object of the present invention is to provide a new hand-driven deburring and assembly tool that is easy and convenient to use.

Even still another object of the present invention is to provide a new hand-driven deburring and assembly tool that reduces the amount of time needed to be spent on finishing holes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a partially cutaway side elevational view of the present invention.

DESCRIPTION OF THE PREFERRED EMBODIMENT

Figure 1:
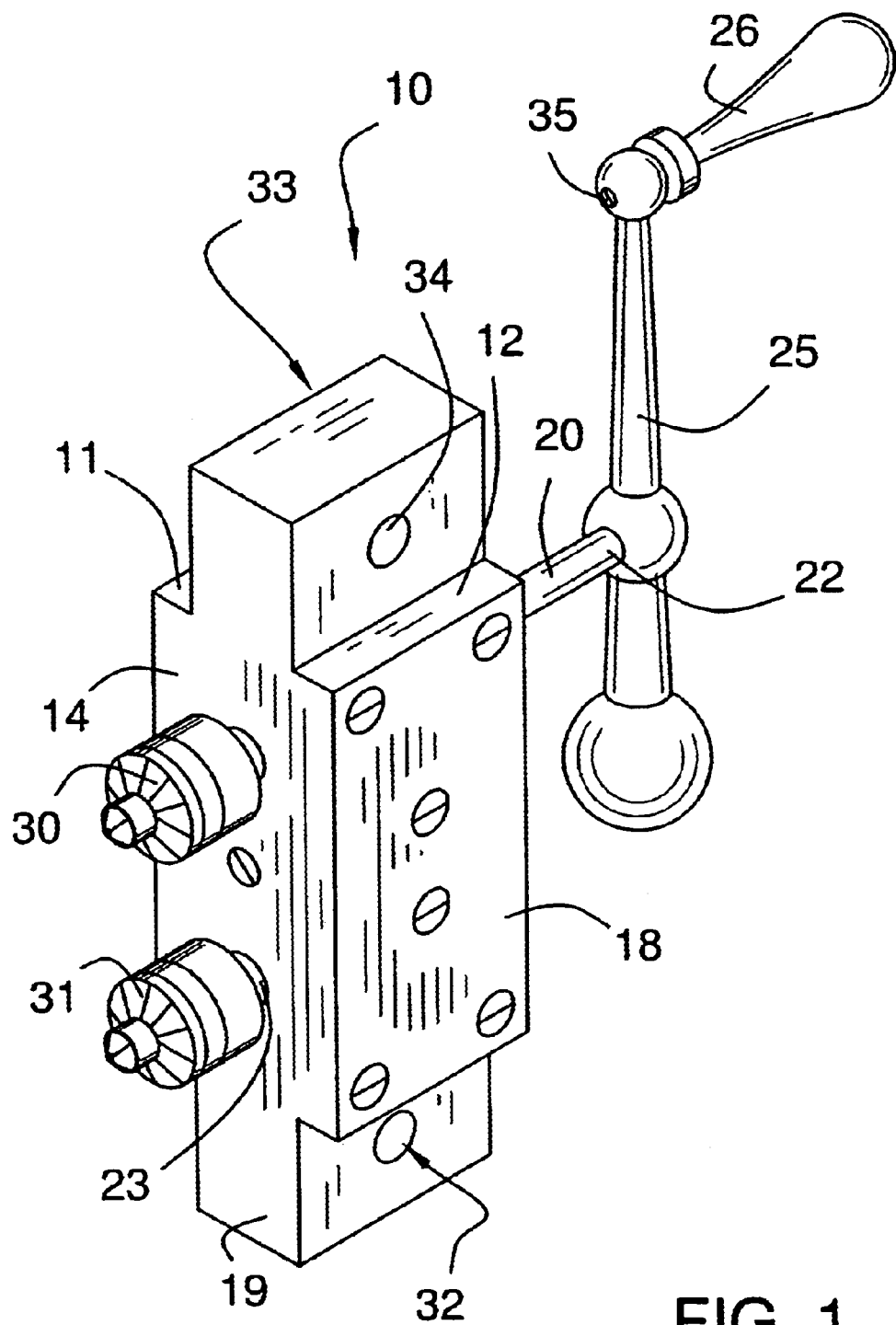
FIG. 1 is a perspective view of a new hand-driven deburring and assembly tool according to the present invention.

With reference now to the drawings, and in particular to FIGS. 1 through 2 thereof, a new hand-driven deburring and assembly tool embodying the principles and concepts of the present invention and generally designated by the reference numeral 10 will be described.

As best illustrated in FIGS. 1 through 2, the hand-driven deburring and assembly tool 10 generally comprises a housing assembly including a housing 11 having top 12, bottom 13, front 14, back 15, side 16 walls and an open side 17. The housing assembly further includes a cover 18 being removably fastened to the housing 11 over the open side 17, and also includes housing support members 19,33 being integrally attached to the top and bottom walls 11,13 of the housing 11 and extending upwardly downwardly therefrom. The housing support members 19,33 are adapted to placed in clamping tool. The housing support members 19,33 are block-like members being recessed from the side walls 16 of the housing 11 and having bores 32,34 extending laterally therethrough. The housing 11 has a length of approximately 6⅞ inches and a width of approximately 2 inches square. Each of the housing support members 19,33 has a length of approximately 1½ inches and a thickness of approximately 1 inch.

A drive assembly is conventionally mounted to the housing 11. The drive assembly includes a main shaft 20 being journaled through the front 14 and back 15 walls of the housing 11 and having a front end 21 and a back end 22, and also includes a crank member 25 being securely and conventionally attached to the back end 22 of the main shaft 20, and further includes a stub shaft 23 being journaled through the front wall 14 of the housing 11, and also includes a gear shaft 24 being rotatably and conventionally attached to an interior of the front wall 14 of the housing 11, and further includes a plurality of gears 27–29 being conventionally mounted about the shafts 20,23,24 in the housing 11, and also includes a handle member 26 being securely, conventionally, and rotatably attached to the crank member 25 with a handle mounting stud 35. The main shaft 20 is disposed near the top wall 12 of the housing 11, and the stub shaft 23 is disposed near the bottom wall 13 of the housing 11, and the gear shaft 24 is disposed intermediate of the main shaft 20 and the stub shaft 23. The plurality of gears 27–29 include a first gear 27 which is securely and conventionally mounted about the main shaft 20 of the housing 11, and also include a second gear 28 which is conventionally mounted about the gear shaft 24 and which is engaged to the first gear 27, and further include a third gear 29 which is conventionally mounted about the stub shaft 23 in the housing 11 and which is engaged to the second gear 28.

Assembly and deburring tool support members 30,31 are conventionally mounted to the drive assembly. The assembly and deburring tools 30,31 are securely and conventionally mounted upon the main shaft 20 and the stub shaft 23 forward of the housing 11. The assembly and deburring tools 30,31 are generally chucks which are adapted to hold assembly and deburring tools which include drill bits, reamers, and taps.

In use, the user secures the housing support member 19 preferably in a vice, and the user would place objects having holes up to the assembly and deburring tool support members 30,31 which are holding assembly and deburring tools, and the user rotates the crank member 25 with one's hand to either debur, ream, or tap the holes in the object.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hand-driven deburring and assembly tool comprising:

a housing assembly including a housing having top, bottom, front, back, side walls and an open side;

a drive assembly being mounted to said housing; and assembly and deburring tool support members being mounted to said drive assembly; and wherein said housing assembly further includes a cover being removably fastened to said housing over said open side, and also includes housing support members being integrally attached to said top and bottom walls of said housing and extending upwardly and downwardly therefrom, said housing support members being adapted to placed in clamping tool.

2. A hand-driven deburring and assembly tool comprising:

a housing assembly including a housing having top, bottom, front, back, side walls and an open side, said housing assembly further including a cover being removably fastened to said housing over said open side, and also including housing support members being integrally attached to said top and bottom walls of said housing and extending upwardly and downwardly therefrom, said housing support members being adapted to placed in clamping tool, said housing support members being a block-like member being recessed from said side walls of said housing and having bores extending laterally therethrough, said housing having a length of approximately 6 ⅞ inches and a width of approximately 2 inches square, each of said housing support members having a length of approximately 1 ½ inches and a thickness of approximately 1 inch;

a drive assembly being mounted to said housing, said drive assembly including a main shaft being journaled through said front and back walls of said housing and having a front end and a back end, and also including a crank member being securely attached to said back end of said main shaft, and further including a stub shaft being journaled through said front wall of said housing, and also including a gear shaft being rotatably attached to an interior of said front wall of said housing, and further including a plurality of gears being mounted about said shafts in said housing, and also including a handle member being rotatably attached to said crank member with a handle mounting stud, said main shaft being disposed near said top wall of said housing, and said stub shaft being disposed near said bottom wall of said housing, and said gear shaft being disposed intermediate of said main shaft and said stub shaft, said plurality of gears including a first gear which is securely mounted about said main shaft in said housing, and also including a second gear which is mounted about said gear shaft and which is engaged to said first gear, and further including a third gear which is mounted about said stub shaft in said housing and which is engaged to said second gear; and assembly and deburring tool support members being mounted to said drive assembly, said assembly and deburring tools being securely mounted upon said main shaft and said stub shaft forward of said housing, said assembly and deburring tools being generally chucks which are adapted to hold assembly and deburring tools which include drill bits, reamers, taps, and fastener heads.

3. A hand-driven deburring and assembly tool as described in claim 1, wherein said housing support members are block-like members being recessed from said side walls of said housing and having bores extending laterally therethrough.

4. A hand-driven deburring and assembly tool as described in claim 1, wherein said drive assembly includes a main shaft being journaled through said front and back walls of said housing and having a front end and a back end, and also includes a crank member being securely attached to said back end of said main shaft, and further includes a stub shaft being journaled through said front wall of said housing, and also includes a gear shaft being rotatably attached to an interior of said front wall of said housing, and further includes a plurality of gears being mounted about said shafts in said housing, and also includes a handle member being rotatably attached to said crank member.

5. A hand-driven deburring and assembly tool as described in claim 4, wherein said main shaft is disposed near said top wall of said housing, and said stub shaft is disposed near said bottom wall of said housing, and said gear shaft is disposed intermediate of said main shaft and said stub shaft.

6. A hand-driven deburring and assembly tool as described in claim 5, wherein said plurality of gears includes a first gear which is securely mounted about said main shaft in said housing, and also includes a second gear which is mounted about said gear shaft and which is engaged to said first gear, and further includes a third gear which is mounted about said stub shaft in said housing and which is engaged to said second gear.

7. A hand-driven deburring and assembly tool as described in claim 4, wherein said assembly and deburring tools are securely mounted upon said main shaft and said stub shaft forward of said housing.

8. A hand-driven deburring and assembly tool as described in claim 7, wherein said assembly and deburring tools are generally chucks which are adapted to hold assembly and deburring tools which include drill bits, reamers, and taps.

* * * * *